DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 491

T877,011
USE OF SILVER PI-COMPLEX STABILIZERS

Kenneth R. Dunham, % Kodak Park Division,
Rochester, N.Y. 14650

Filed Feb. 11, 1970, Ser. No. 10,638
Int. Cl. G03c *1/02, 5/38*
U.S. Cl. 96—94
No Drawing. 22 Pages Specification

A developed image in a photographic element containing a photographic pi-complex of a silver salt, especially a water-soluble silver salt and an organic compound, such as a silver cycloheptatriene pi-complex, can be stabilized with a silver pi-complex stabilizer, such as a thiadiazole, purine, benzimidazole, imidazoline, or pyrimidine. Such stabilizers are desirably odorless and form a stable silver mercaptide. The photographic element can contain light-sensitive titanium dioxide. An image in an exposed photographic element containing a photographic sliver pi-complex, a silver halide developing agent, and a silver pi-complex stabilizer can be developed and stabilized by heating the photographic element.